(12) United States Patent
Kataoka

(10) Patent No.: US 6,524,670 B1
(45) Date of Patent: Feb. 25, 2003

(54) SANDBAG

(75) Inventor: Kei Kataoka, No. 13-34, Kogawashinmachi 2-chome, Yaizu-shi, Shizuoka-ken 425-0031 (JP)

(73) Assignee: Kei Kataoka, Yaizu (JP)

( * ) Notice: Subject to any disclaimer, the term of this patent is extended or adjusted under 35 U.S.C. 154(b) by 106 days.

(21) Appl. No.: 09/583,763

(22) Filed: May 31, 2000

(30) Foreign Application Priority Data

Aug. 6, 1999 (JP) ............................................ 11-223578

(51) Int. Cl.⁷ ................................................. B32B 9/00
(52) U.S. Cl. .................... 428/35.2; 428/35.6; 428/35.7; 428/36.1; 428/36.2; 428/36.4; 206/204
(58) Field of Search ............................... 428/35.6, 34.2, 428/34.3, 35.2, 35.7, 36.1, 36.2, 36.4; 206/204

(56) References Cited

U.S. PATENT DOCUMENTS

| | | | | | |
|---|---|---|---|---|---|
| 4,588,505 | A | * | 5/1986 | Walley et al. | ............... 206/204 |
| 4,645,698 | A | * | 2/1987 | Matsubara | ................... 206/204 |
| 5,150,707 | A | * | 9/1992 | Anderson | ................... 604/368 |
| 5,324,429 | A | * | 6/1994 | Holland | ....................... 210/484 |
| 5,356,678 | A | * | 10/1994 | Heitzhaus et al. | .......... 204/206 |
| 5,462,785 | A | * | 10/1995 | Holland | ....................... 210/924 |
| 5,820,955 | A | * | 10/1998 | Brander | ...................... 206/204 |
| 6,319,573 | B1 | * | 11/2001 | Lokken | ....................... 169/48 |

FOREIGN PATENT DOCUMENTS

| JP | 8-134865 | 5/1996 |
|---|---|---|
| JP | 61-169509 | 7/1996 |
| JP | 62-133204 | 6/1997 |

* cited by examiner

Primary Examiner—Rena Dye
(74) Attorney, Agent, or Firm—Oliff & Berridge, PLC

(57) ABSTRACT

A sandbag comprising an outer bag coarsely woven by strong fiber such as hemp; and a thin inner bag having high permeability such as cotton, which contains a water soluble pack made of such as polyvinyl alcohol film, having water swelling and absorptive resin. The double-layer-bag structure accelerates the water swelling and absorption speed by simultaneously preventing the leakage of the contents.

2 Claims, 2 Drawing Sheets

SANDBAG

BACKGROUND OF THE INVENTION

1. Field of the Invention

The present invention relates to a sandbag utilising water swelling and absorptive resin.

2. Description of the Related Art

There have been serious flood disasters, both to human and economy, which occurred because of collapse of embankment due to deluge, inundation of houses due to heavy rain, striking of seawater to the land due to the seismic sea wave, sudden and accidental extrusion of water during tunneling work, intrusion of water from entrance to underground facilities due to flood, etc. When the flood disaster occurs, in order to present such a disaster, as temporary and emergency measures for preventing intrusion of water or mud (sand), there has been used a mass of sandbags. A sandbag usually comprises a permeable bag filled with sands, and the sandbags will be cast to the point water will overflow among as area where the water will intrude. However, since large-sued machines cannot be used when such a disaster or accident occurs, the filling of sands should essentially be relied on working by human power, which is of course severe and dangerous, and therefore it is hard to say, because of its poor workability, that the disaster can be prevented completely by using the sandbags as above discussed.

Recently, instead of the above discussed sandbag filled with sands, there has bean provided a sandbag with facile handling and storage, comprising a permeable bag in which water selling and absorptive resin is filled so that, by supplying water therewith or being soaked in water, the sandbag will be gelated and swelled, thus can be used. For example, Japanese Unexamined Patent Publication No. Sho 61-169509 discloses a sandbag filled with powder of the water swelling and absorptive resin. Further, Japanese Unexamined Patent Publication No. Sho 62-133204 discloses a sandbag filled with pellets comprising mixture of water swelling and absorptive resin and fibrous material. However, in regard to each of the above sandbags, the water swelling and absorptive resin of which volume is smaller than the capacity of bag should be filled in the bag in a scattered form (that is, not in a form of lump or single package), thus the filling work thereof in the bag is troublesome, inefficient and not cost-effective. Further, in order to prevent the contents of bag from leaking out of the bag during being swelled, the smaller mesh should be used for the bag. Consequently, the water absorption speed into the bag during water supply would become slower, which results is problematic slower gelation speed of the contents of bag.

On the other head, according to Japanese Unexamined Patent Publication No. Hei 08-134865, there is provided a sandbag comprising water swelling and absorptive resin spread and sandwiched at substantially uniform thickness between two water absorptive sheets which are one size smaller than the bag. The two sheets sandwiching the water swelling and absorptive resin are needle punched and thus fixed, then are inserted in the bag. Since the water swelling and absorptive resin sandwiched between the two or more water absorptive sheets is spread at substantially uniform thickness, part of the water swelling and absorptive resin will not be concentrated at any position in the bag. Accordingly the water absorptive sheet should have certain extent at hardness, thus rather harder fabric such as felt is used for the water absorptive sheet. However, the fabric such as felt ordinarily has poor water absorptivity, thus it has been difficult to accelerate the gelation speed during water supply. In addition, since the water swelling and absorptive resin should be spread and sandwiched at substantially uniform thickness between the two water absorptive sheets, the troublesome working therefor should be required. Further, since the size of sheets sandwiching the water swelling and absorptive resin are only a little smaller than that of the bag (that is, the sizes of the sheets and bag are substantially the same with each other), it requires still troublesome and ineffective working to insert these sheets in the bag. Consequently, as the preparation work is troublesome and ineffective, and as the expensive material such as felt should be need for the water absorptive sheet in order to secure a certain extent of hardness of the sheet, higher cost should be required for manufacturing this kind of sandbag.

SUMMARY OF THE INVENTION

In the light of problems which have been described as above, the object of the present invention is to provide a sandbag utilizing water swelling and absorptive resin, with faster water absorption speed, no leakage of contents during being swelled, facile handling, and cost-effectiveness.

For the object as above discussed, according to the present invention, there is provided a sandbag comprising: as outer bag coarsely woven by strong fiber; and a thin inner bag having high permeability, in which the inner bag contains a water soluble peak containing water swelling and absorptive resin.

The sandbag comprises double-layer-bag structure, that is, the outer bag made of textile coarsely woven by strong fiber so that sufficient strength to endure the load of pile of the sandbags may be obtained after being stalled by water, and the inner bag thinner than the outer bag with having high permeability. Since the outer bag has the coarse mesh, and since the inner bag is thin, the fast water absorption can be accomplished. Consequently, since both the outer and inner begs have good permeability, when the sandbag is supplied with water or soaked in water for using thereof, the water will immediately enter inside the bag. In addition, since the water soluble pack will dissolve immediately after being is touch with water, the water entered inside the inner bag will instantly become in touch with the water, swelling and absorptive resin inside the pack, thereby the resin will instantly absorb the water and will be swelled. Thus the gelation speed during water absorption can remarkably be accelerated.

With this structure, since the water swelling and absorptive resin contained in the water soluble pack will absorb pure water of which volume is several tens to hundreds times of that of the resin, and will be swelled end gelated, when the sandbag is supplied with water, or soaked in water, the swelled sandbag can be obtained easily. Further, because of the double-layer-bag structure of the sandbag, although the strong but coarse textile is used for the outer bag, since the smaller mesh is used for the inner bag, the swelled resin can be prevented from leaking out of the bag.

Further, because of the water swelling and absorptive resin contained in the water soluble pack, during manufacturing of the sandbag, that is, when the water soluble pack is enclosed in the sandbag, considerably facile handling of the water swelling and absorptive resin can be accomplished which may result in good workability and cost-effective for manufacturing of the sandbags. In other words, since the water soluble peak will dissolve immediately after being in touch with water, and each a pack will not be any obstacle to swelling of resin, the pack can be minimized, thus the pack can be enclosed in the sandbag easily, with good workability.

For example, the water swelling end absorptive resin can arbitrarily be selected among the group of polyacrylate, polyacrylonitrile saponide (i.e. saponified product thereof), acrylate/vinylalcohol copolymer, starch/acrylic acid graft copolymer, starch/acrylonitrile graft copolymer saponide, cellulose/acrylic acid graft copolymer, polyacrylamide and partial hydrolysate thereof, polyvinyl alcohol, polyethylene oxide, etc.

Preferably, there may be provided a sandbag according to the present invention wherein the outer bag is made of hemp; the inner bag is made of cotton; and the water soluble pack is made of polyvinyl alcohol film, in which the water soluble pack made of polyvinyl alcohol film is prepared by first containing the water swelling and absorptive resin therein and by then being sealed by heat.

The outer bag made of hemp has sufficient strength against the load of pile during used as the sandbag, and if the coarse mesh is adopted thereto, the water absorption map become faster. Further, because of the double-layer-bag structure of the sandbag comprising the outer and inner bags, although the outer bag is made of hemp having coarse mesh, since the inner bag made of cotton has smaller mesh, the water swelling and absorptive resin will absorb water and will be gelated without leaking out of the bag. Further, since the inner bag made of cotton is thin and has excellent permeability, even the double-layer-bag structure of the sandbag will not spoil the water absorptivity of the water swelling and absorptive resin. As the natural fibers such as hemp and cotton are made for the material of the sandbag, when the sandbag should be disposed, any toxic substance such as dioxin will not be generated while being burnt, and there is no bad effect to soil in the case of being buried in the ground.

The polyvinyl alcohol (hereinafter "PVA") ) film used for the water soluble pack will not generate any toxic gas such as chlorine gas during being burnt. Further, there exists microbe which decomposes PVA solved in water. Therefore the PVA film serves as the water soluble plastic film having good characteristic in regard to securing of the environmental and human safety. Further, since various heat sealing machines can easily heat and seal the PVA film, facile manufacturing of the water soluble peak can be accomplished. Since the water swelling and absorptive resin is contained is the thus discussed water soluble pack, the handling thereof is easy, and the water swelling and absorptive resin can be enclosed in the water soluble pack easily. Thus the affective and low-cost manufacture of the sandbags can be accomplished.

BRIEF DESCRIPTION OF THE DRAWINGS

The invention will be described below is detail with reference to the accompanying drawings, in which.

DETAILED DESCRIPTION THE INVENTION

An embodiment of the present invention will now be described in detail with reference to FIGS. 1 through 4.

Figure 1:
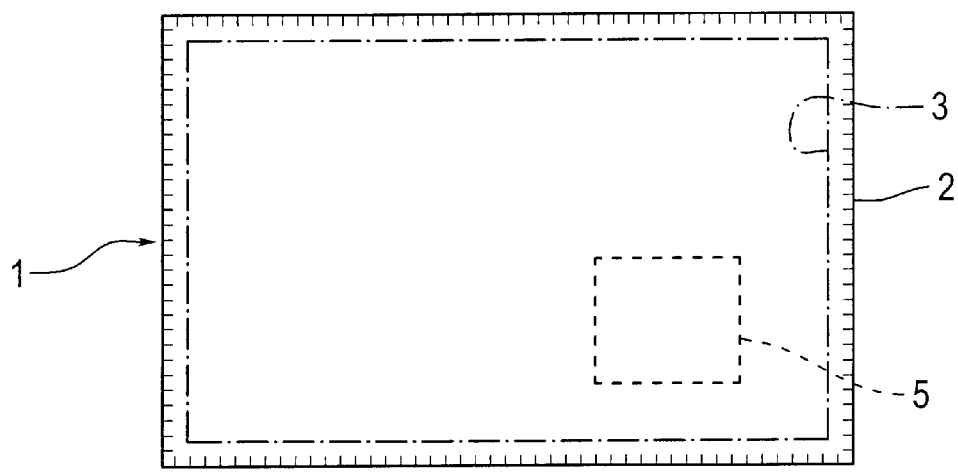
FIG. 1 is a plan view of as embodiment of a sandbag according to the present invention.

FIG. 1 is a plan view showing an embodiment of a sandbag according to the present invention. An inner bag 3 is illustrated by chain line, and a water soluble pack 5 contained in a sandbag 1 is illustrated by broken line.

The sandbag 1 comprises, an outer bag 2 coarsely woven by strong fiber, and the inner bag 3 made of thin cloth having high permeability. The outer bag 2 and the inner bag 3 serve as a main body 4 of the sandbag if in which a water soluble pack 5 containing water swelling and absorptive resin 6 is enclosed. The hems of the main body 4 are seamed by yarn. In the present embodiment, the outer bag 2 is made of hemp, the inner bag 3 is made of cotton, and the water soluble pack 5 is made of polyvinyl alcohol (hereinafter "PVA") film.

Figure 2:
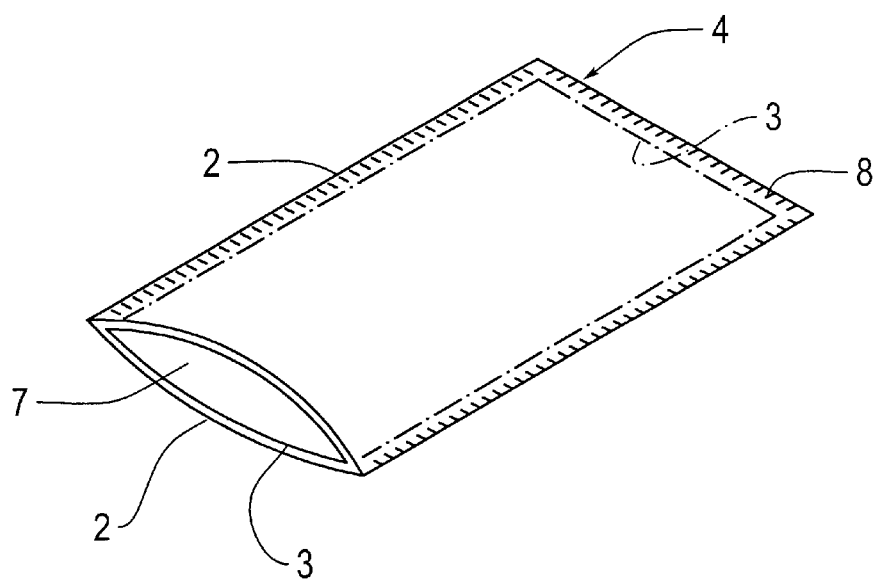
FIG. 2 is a perspective view of the sandbag of FIG. 1.

FIG. 2 is a perspective view of the main body 4 which consists of the outer bag 2 and the inner bag 3. Although there is no limitation how the main body 1 should be prepared with regard to the present embodiment as an example, first, there is a thick cloth woven by coarse hemp, and there is also a thin cotton cloth one size smaller than the thick hemp cloth. The cotton cloth is laid over the hemp cloth, then they are folded, and the hems thereof are seamed by yarn (which serves as a seam 8), thus the forming of bag can be completed. At that time, the hem along one side of the bag should not be seamed in order to provide an opening 7. Preferably any strong yarn such as hemp yarn may be used for seaming of the hems. For example, the size of the outer bag 2 is approximately 60 cm×38 cm. The size and shape of the main body 4 are of course not limited to this example, and can be determined arbitrarily.

Figure 3:
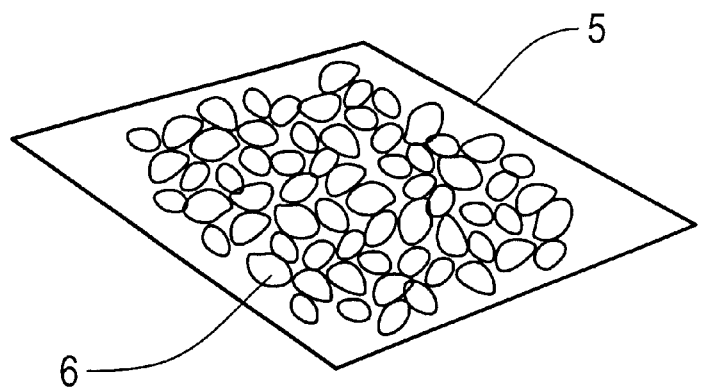
FIG. 3 is a perspective view of a water soluble pack of the sandbag of FIG. 1.

FIG. 3 is a perspective view of the water soluble pack 3, in which as appropriate quantity of water swelling and absorptive resin 6 is contained. According to the present embodiment, since the PVA film used for the water soluble pack 5 can be sealed by various heat sealing machine, after pouring predetermined quantity of the water swelling and absorptive resin 6 in the bag-shaped PVA film, the opening of this bag can easily be sealed by heat, thus the packaging of the water soluble pack 5 can be carried out under simple and automated production line. Further, since it is sufficient to provide the small size of the water absorptive pack 5, the automated production line can be further simplified and minimized. As an example of the embodiment, in regard to the outer bag 2 of which size is 60 cm×38 cm, the water absorptive pack 5 may be the smaller one of which size is, for example, about 19 cm×16 cm. The quantity of the water swelling and absorptive resin 6 contained in the voter soluble pack 3 is about 100 g.

As above discussed the water soluble pack 5 is enclosed in the main body 4 comprising the outer bag 2 and the inner bag 3, from the opening 7. Then the opening 7 is seamed by strong hemp yarn, thus the sandbag 1 according to the present invention can be provided in a simple manner. As the water swelling and absorptive resin 6 is contained in the water soluble pack 5, the handling thereof is also simple. Further, since the wise of the water soluble pack 5 is considerably smaller than that of the main body 4, the enclosing procedure of the water soluble pack 5 can be carried out easily and quickly. The thus obtained sandbag 1 before actual use (water absorption) is light-weight and can be folded to be the small size, thus is advantageous to the transportation and storage, and has high workability during actual use thereof.

Figure 4:
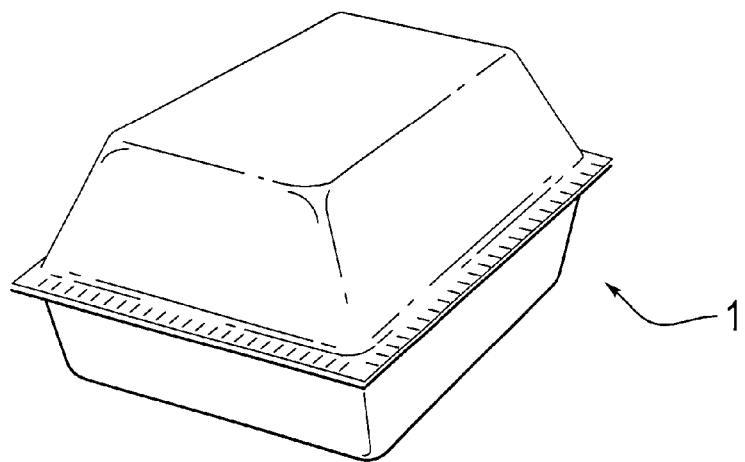
FIG. 4 is a perspective view showing the state of the sandbag after absorption of water.

When the thus obtained sandbag 1 is supplied with a large quantity of water or is soaked in water, the water swelling and absorptive resin 6 is swelled and gelated, thus the main body 4 becomes fully swelled out, and will in fact have a function to use as the sandhog. The swelled state of the sandbag 1 is as illustrated in FIG. 4. Since the outer bag 2 is made of coarse hemp the water absorption can be carried out quickly. Further, since the inner bag 3 is made of thin cotton cloth, the water absorption can also be carried out quickly. Accordingly, since each of the outer and inner bags 2 and 3 has good permeability, when the sandbag 1 is supplied with water during use thereof, the water will quickly enter inside the sandbag 1. When the water soluble pack 5 becomes in touch with water, the water soluble pack 5 will instantly dissolve, thus the water swelling and absorptive resin 6 will immediately become in touch with water. The water swelling and absorptive resin 6 will then absorb water and become swelled and gelated, thereby the swelled sandbag 1 as illustrated to FIG. 4 can be obtained. In the present embodiment, when 100 g of the water swelling and absorptive resin 6 absorbs water, it is possible to obtain 17.3 kg of the sandbag 1.

In the prior art, where a hemp bag is to be used for a sandbag, if the coarse mesh is adopted in order to obtain sufficient permeability, the water swelling and absorptive resin will leak out of the bag. On the other hand, if the small mesh is adopted in order to prevent the water swelling and absorptive resin from leaking out of the bag, the good permeability cannot be obtained. However, according to the present invention, since the main body 4 has the double-layer-bag structure in which the smaller mesh is adopted to the inner bag 3, the water swelling and absorptive resin 6 will absorb water and be swelled and gelated without leaking out of the inner bag 3. Therefore the coarsely woven hemp bag can be used as the outer bag 2.

It is of course possible to use synthetic fiber such as polyester or acrylic fiber, or semi-synthetic fiber, such as rayon fiber. However, from the environmental point of view is regard to the disposal after use thereof, it is desirable to use natural fiber, and therefore, because of their good permeability, strength and cost-effectiveness, it is desirable to use hemp and cotton. In addition, the inner bag 3 is not limited to the bag made of textile, and it is possible to use any other material such as a film having many small holes therethrough, as long as the good permeability and thinner shape are secured. Further, the material of the water, soluble peak 5 is not limited to the PVA film, and it is possible to use any other water soluble material such as water soluble paper or "oblate" (i.e. a wafer for wrapping such as powdered medicine). In any case, the PVA film is one of the most suitable materials for the water soluble pack 5, since the PVA film will not generate any toxic gas such as chlorine gas during being burnt, and further, since there exists microbe which decomposes PVA solved in water. Therefore the PVA film has good characteristic in regard to securing of the environmental and human safety. The water swelling and absorptive resin 6 need for the present invention can arbitrarily be selected from any of the high-level water absorptive polymer, among the group of polyacrylate, polyacrylonitrile saponide (i.e. saponified product thereof), acrylate/vinylalcohol copolymer, starch/acrylic acid graft copolymer, starch/acrylonitrile graft copolymer saponide, cellulose/acrylic acid graft copolymer, polyacrylamide and partial hydrolysate thereof, polyvinyl alcohol, polyethylene oxide, etc.

As above discussed, according to the present invention, since the sandbag has the double-layer-bag structure comprising the outer case coarsely woven by strong fiber and the thin inner case having good permeability, the quick water absorption and gelation can be accomplished, and the gelated water swelling and absorptive resin can be prevented from leaking out of the bag, in spite of the coarse mesh of the outer bag. In addition, since the water swelling and absorptive resin is contained in the water soluble pack, the facile handling of the water swelling and absorptive resin can be accomplished, thereby the enclosing procedure of the water swelling and absorptive resin in the sandbag can effectively be carried out, thus the sandbag can be manufactured at lower cost.

Further, according to the present invention, when the sandbag is formed by using the hemp bag as the outer bag, the cotton bag as the inner bag, and the PVA film as the water soluble pack, then the sandbag can be manufactured more effectively and at still lower coat. The thus manufactured sandbag is not expansive, and since this sandbag is made of natural fiber, after use of the sandbag, it is harmless to environmental health even when the sandbag is burnt, buried in the ground or left on the ground.

What is claimed is:

1. An absorbent bag, comprising a woven outer bag made of hemp; a permeable inner bag made of cotton; and a water soluble pack made of polyvinyl alcohol film, wherein the water soluble pack is prepared by first containing a water swelling and absorptive resin therein and by then sealing the water soluble pack with heat, and wherein the inner bag contains the water soluble pack.

2. The sandbag as claimed in claim 1, wherein said water swelling and absorptive resin is selected from the group consisting of polyacrylate, polyacrylonitrile saponide, acrylate/vinylalcohol copolymer, starch/acrylic acid graft copolymer, starch acrylonitrile graft copolymer saponide, cellulose/acrylic acid graft copolymer, polyacrylamide and partial hydrolysate thereof, polyvinyl alcohol, and polyethylene oxide.

* * * * *